May 5, 1970     S. LUTZ     3,509,902

TIRE VALVE SUPPORT TUBE

Original Filed Feb. 11, 1966

INVENTOR
Sepp Lutz by McGlew & Toren
ATTORNEYS

United States Patent Office 3,509,902
Patented May 5, 1970

3,509,902
TIRE VALVE SUPPORT TUBE
Sepp Lutz, Giengen (Brenz), Germany, assignor to Alligator Ventilfabrik GmbH, Giengen (Brenz), Germany
Continuation of application Ser. No. 526,766, Feb. 11, 1966. This application Aug. 26, 1968, Ser. No. 755,458
Claims priority, application Germany, Mar. 4, 1965, 1,480,868
Int. Cl. F16k 15/20
U.S. Cl. 137—223     2 Claims

ABSTRACT OF THE DISCLOSURE

A valve shaft construction for a pneumatic tire valve comprises a tube which has a substantially uniform diameter bore which is unobstructed throughout its length. The tube is narrowed only in an area spaced from the inlet end in order to define an interior shoulder against which the valve casement abuts. The construction provides a simple manufacture and permits fast filling and discharge of fluids therethrough.

---

This invention relates, in general, to a valve construction and, in particular, to a new and useful pneumatic tire valve having a valve shaft with an interior shoulder formation for retaining the operating valve mechanism or case.

The present invention is an improvement over the prior art, particularly in respect to the simplicity of the construction of the valve shaft, which includes a shoulder formation for supporting the valve case. Prior to the present invention, it was usual to form the valve shaft with a complicated construction for receiving the valve case. The construction involved required much time and material for its formation. This was particularly so for the long tubular valve shafts so that the required working time therefore had a great influence on the cost price.

In accordance with the present invention, there is provided a valve shaft construction, which includes a bore with an interior shoulder formation formed by identing or crimping the exterior wall of the valve shaft at a location to precisely hold the valve case within the valve shaft adjacent the outer end of the shaft. The valve shaft, of the present invention, is advantageously formed as a simple sleeve or tubular element having an inside diameter adapted to the outside diameter of the valve case and which has an indented narrow interior shoulder formation for the case. By such a construction, it is possible to form the valve case with a substantial reduction of manufacturing cost and it is also possible to insert the case in the valve shaft with little difficulty. The construction also makes it possible to more rapidly fill and empty the tire, since the interior width of the shaft is greater than the inside width of the conventional shafts. In a preferred arrangement, the narrowing of the shaft to form the shoulder need take place only at certain areas so that there is no material reduction in the flow cross section which may hinder the flow of air into and out of the tire. In a preferred arrangement, the shoulder is formed by a plurality of external crimpings on the exterior wall of the shaft which extend inwardly to the interior to form the shoulder formation.

In accordance with another embodiment of the invention, a valve shaft is formed with at least one bend made at a location from the outer end of the valve shaft comparable to the dimensions of the valve case and with a narrowing formation adjacent the bend forming the shoulder for holding the valve case.

In accordance with a preferred method of the invention, the valve shaft is formed from a tubular element which is crimped at a spaced location from the end to form interior shoulders for accommodating the valve case.

Accordingly, it is an object of the invention to provide an improved valve shaft for a pneumatic tire which includes an interior shoulder formation at a spaced location from its outer end forming a shoulder for receiving the interior end of a valve case.

A further object of the invention is to provide a method of forming a valve shaft which includes forming the shaft from a tube of constant internal diameter and forming an internal shoulder in the shaft by crimping the exterior thereof at a spaced location from its outer end so as to provide internally projecting portions forming a shoulder for holding the valve case.

A further object of the invention is to provide a valve and a valve shaft construction which are simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
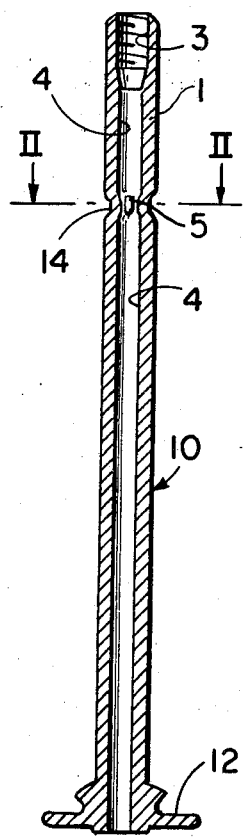
FIG. 1 is a longitudinal sectional view of a valve shaft constructed in accordance with the invention.
Figure 2:
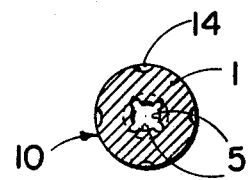
FIG. 2 is a section taken on the line II—II of FIG. 1.

Referring to the drawings, in particular, the invention, as indicated in FIGS. 1 and 2, includes a valve shaft generally designated 10 for a pneumatic tire which includes an inner flange portion 12 formed at the inner end of a tube 1 of substantially uniform diameter. The upper end of the tube 1 is provided with internal threads 3 for receiving a valve case or valve operating mechanism assembly (not shown). The remaining portion of the interior of the tube 1 is provided with a substantially constant diameter 4.

In accordance with the invention, the interior of the shaft 10 is provided with a narrowing forming a shoulder or supporting ledge 5 for the valve case which is not represented in FIG. 1. The shoulder formation 5 is formed by indenting the exterior wall of the tube 1 at the locations 14 in order to form the interiorly projecting indentations which form the supporting shoulder 5. The shoulder 5 provides a support for the dipod of the valve case when the latter is inserted into the opened or outer end of the valve shaft 10 at the location of the threads 3.

Figure 3:
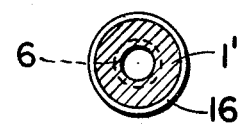
FIG. 3 is across section similar to FIG. 2, but of another embodiment of the invention.

In the embodiment of FIG. 3, a shoulder 6 is formed by indenting or compressing the exterior wall of the tube 1' around an annular area 16.

Figure 4:
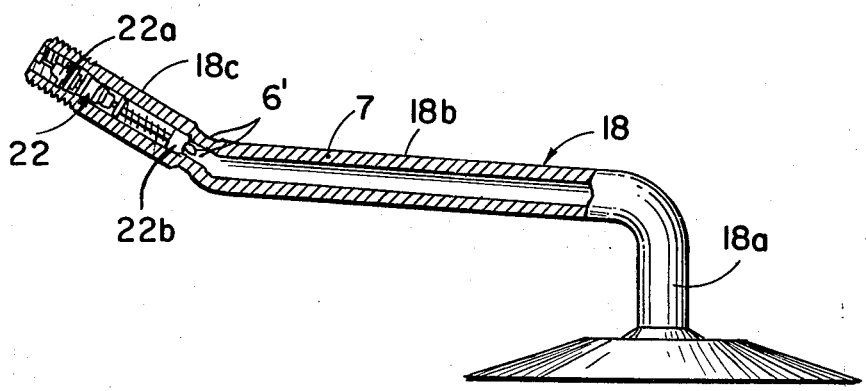
FIG. 4 is a partial elevational and partial longitudinal sectional view of another embodiment of a valve constructed in accordance with the invention.

In the embodiment indicated in FIG. 4, there is provided a valve shaft generally designated 18, which includes a vertical portion 18a, a first substantially horizontal bent portion 18b and an outer bent off portion 18c. As in the previous embodiment, the valve is formed of a tube 7 which is advantageously bent at 20 directly adjacent the formation of an internal ledge or shoulder 6' for supporting a valve case or valve operating mechanism assembly generally designated 22. An outer portion 22a of the valve case 22 is threaded into the outer end of the tube 7 and an inner portion or dipod 22b is retained on the shoulder formation 6'. By forming the shoulder 6' by a series of indentations around the periphery of the tube 7, there is no great reduction in the valve internal flow area which has been the case in valve constructions heretofore provided. The shoulder 6' may be produced by various non-cutting methods, such as rolling, stamping and the like.

While specific embodiments of the invention have been shown and described in detail to illustrate the application of the inventive principles, it will be understood that the invention may be embodied otherwise without departing from such principles.

What is claimed is:

1. A valve shaft construction for pneumatic tire valve, comprising a bare metal tube having a tire engaging portion with a flanged end, said tube having an inlet end with a uniform diameter bore and an internal thread extending inwardly from said inlet end, the walls of said tube having a plurality of short impressions extending inwardly from the exterior surface and protruding into the bore at a spaced location from said inlet end and defining an interior inwardly projecting shoulder, and a valve case threaded into the open end of said tube and having an inner end portion bearing against said shoulder, said tube being of substantially uniform diameter and unobstructed throughout its length except in the area of said shoulder; said impressions defining a bend line adjacent their inner end facilitating the bending of said inflow portion relative to said intermediate portion for orienting said inflow portion at an angle to said intermediate portion.

2. A valve shaft construction according to claim 1, wherein said inpressions are equally circumferentially spaced and extend longitudinally.

References Cited

UNITED STATES PATENTS

| 1,171,147 | 2/1916 | Schweinert. |
| 1,251,585 | 1/1918 | Schweinert et al. |
| 1,761,487 | 6/1930 | Oakley. |
| 2,074,195 | 3/1937 | Uphoff. |
| 2,254,000 | 8/1941 | Broecker. |
| 3,228,419 | 1/1966 | Smith et al. |

HAROLD W. WEAKLEY, Primary Examiner

U.S. Cl. X.R.

137—234.5, 535